United States Patent [19]

Schleifer

[11] 3,818,457

[45] June 18, 1974

[54] DATA PROCESSING UNIT HAVING A DIGITAL READOUT INDICATOR

[75] Inventor: Klaus Schleifer, Ulm, Danube, Germany

[73] Assignee: Walter Buromaschinen GmbH, Gerstetten, Germany

[22] Filed: Oct. 11, 1972

[21] Appl. No.: 296,554

[30] Foreign Application Priority Data

Oct. 20, 1971 Germany ........................... 2152160

[52] U.S. Cl. .............................. 340/172.5, 340/324

[51] Int. Cl. ............................................. G06f 3/14

[58] Field of Search ...................... 340/172.5, 324 A

[56] References Cited

UNITED STATES PATENTS

| | | | |
|---|---|---|---|
| 3,654,612 | 4/1972 | Ohara et al. | 340/172.5 |
| 3,678,466 | 7/1972 | Spangler | 340/172.5 |
| 3,688,272 | 8/1972 | Baumgartner | 340/172.5 |

*Primary Examiner*—Paul J. Henon
*Assistant Examiner*—John P. Vandenburg
*Attorney, Agent, or Firm*—Edmund M. Jaskiewicz

[57] ABSTRACT

An electrically controlled data processing unit comprises a computer, a digital readout indicator and a timer unit. A computer switch key and a time indication switch kay arranged on the keyboard of the computer are connected to a control switch so that the digital readout can be connected selectively by this control switch to the logic unit of the computer or the frequency divider counter unit of the timer. A further switch on the keyboard connects the digital readout and the logic unit of the computer to a source of electrical energy. The frequency divider counter unit and the timing generator are connected permanently to a second source of electrical energy through a battery.

3 Claims, 4 Drawing Figures

DATA PROCESSING UNIT HAVING A DIGITAL READOUT INDICATOR

The present invention relates to an electrically controlled data processing unit having a digital readout indicator, more particularly, to an arrangement for selectively connecting the logic unit of the computer or a timer to the digital readout.

It has been known to construct a wide variety of electronic devices, such as radio and television sets, with a digital clock assembled rigidly or integrally into the housing. However, these digital clocks required a separate electronic timing unit as well as indicator which were separate and distinct from the basic electronic device. Thus, the known constructions of an electronic device and a timer were limited to the addition of a complete digital clock into the existing housing of an electronic device, but wherein the electronic components of the basic device were not utilized in the clock. In such constructions, the clock is connected electrically to the basic electronic device in order to connect or disconnect the supply of electric current to the basic device in accordance with a certain predetermined program or sequence. Based upon the known prior art an electronic device having a built-in digital clock or timer thus comprised two separate sets of components which operated independently of each other. This resulted in a relatively inefficient construction and necessitated a somewhat larger housing in order to contain both systems.

It is therefore the principal object of the present invention to provide a novel and improved data processing unit incorporating a digital readout indicator.

It is another object of the present invention to provide a novel data processing unit having a computer, a digital readout indicator and a timer unit.

It is a further object of the present invention to provide an electronically controlled computer incorporating a built-in digital timing unit wherein the electronic components and indicator elements already existing in the computer are utilized for the additional operation of a timer and in which the timer can be selectively connected to the indicator device.

The objects of the present invention are achieved and the disadvantages of the prior art as described above are eliminated by the data processing unit disclosed herein. According to one aspect of the present invention a data processing unit having a computer, a digital readout indicator and a timer unit comprises a keyboard having a computer switch key, a timer switch key and a circuit breaker key thereon. The computer includes a logic unit and the timer unit includes a frequency-divider counter unit and a timing generator. A control switch is provided for connecting selectively the logic unit or the timer to the digital readout indicator. A first electrical current supply is connectable to the digital readout indicator and logic unit through the circuit breaker switch. A second electrical current supply is connected permanently to the frequency-divider and the timing generator through a battery.

The digital readout unit may be replaced by an output printer unit which is similarly selectively connectable to either the logic unit or the timer unit.

Other objects and advantages of the present invention will be apparent upon reference to the accompanying description when taken in conjunction with the following drawings, which are exemplary, wherein.

Figure 1:
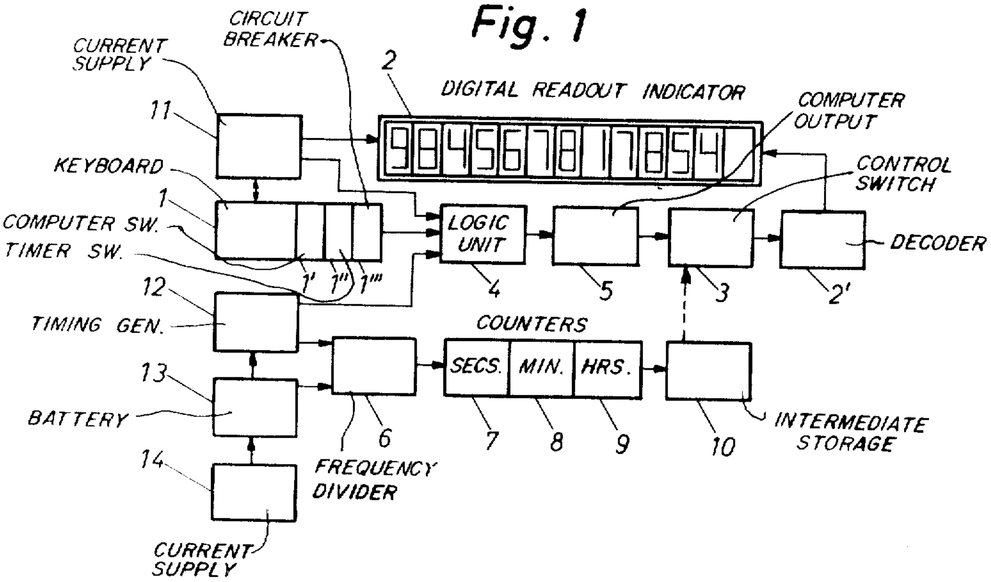
FIG. 1 is a block-diagram of the data processing unit according to the present invention showing the connections to enable the computer to be operational and its results can be read on the digital readout.

As may be seen in the drawings, wherein like reference symbols indicate the same parts throughout the various figures, an electronic data processing unit according to the present invention comprises a keyboard 1, a digital readout indicator 2 and a logic unit 4. A supply of electric current 11 is switched on to energize the indicator 2 and the logic unit 4 by means of a computer switch key 1' on the keyboard 1. Simultaneously with the actuation of key 1', a control switch 3 is programmed so as to conduct the results of the computer from computer output 5 to the indicating unit 2 via a decoder 2'.

A timing generator 12 and a frequency-divider unit 6 are supplied continuously with electrical current from a second source of electrical current 4 through a small battery 13 which is connected therebetween as a buffer. The small battery 13, in effect, functions as a safety in the event of short unforeseen failures of an electrical current from the supply 14.

The timing generator 12 supplies the 200 kilohertz fundamental frequency of a quartz crystal to the logic unit 4 of the computer as well as to the frequency divider unit 6. The frequency divider unit has an output frequency of 1 hertz which is supplied to the counters comprising seconds counter 7, minutes counter 8 and hours counter 9. In place of the quartz crystal, it is possible to employ the line frequency, to which the current supplies 11 and 12 are connected, for timing purposes under certain circumstances.

A circuit breaker 1''' is provided on the keyboard 1 and actuation of this circuit breaker will disconnect the electric current supply from the computer and the indicator.

Figure 2:
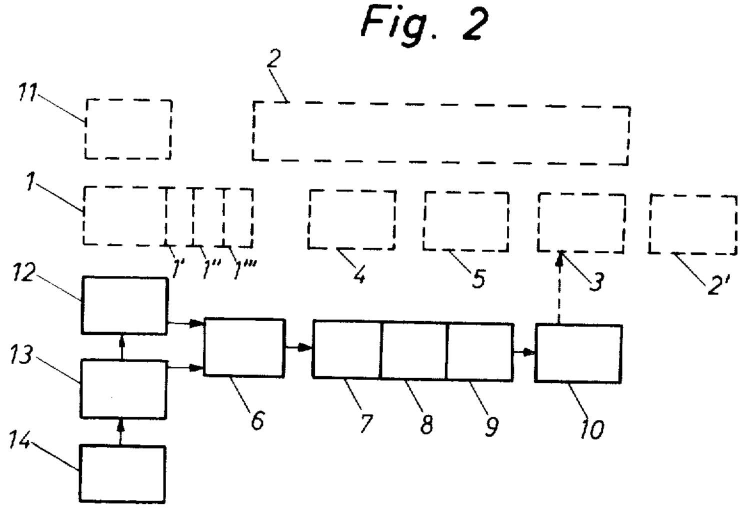
FIG. 2 is the same block-diagram as shown in FIG. 1 but wherein the computer unit is switched off and the components associated with the computer units are represented by dashed lines.

As may be seen in FIG. 2, the computer unit is switched off and those components which are inoperative in this state are indicated by the dashed lines. However, the timing unit which is always in operation in this state is still operative when the computer is switched off and the time data is conducted to an intermediate storage register 10 from which the data can be read or conducted to some other output terminal.

The keyboard 1 is further provided with a time indication switch key 1'' the actuation of which will connect the current supply 11 for the indicator unit 2 and simultaneously will actuate the control switch 3 which is programmed so that the results of timer unit 6, 7, 8, and 9 are conducted from the intermediate storage register 10 to the digital readout indicator 2 via decoder 2''. When the data processing unit is performing this function, the logic unit 4 and the computer output 5 are disconnected as will be seen in FIG. 3. The other two functional states, as illustrated in either FIG. 1 or FIG.

2, can be produced again by actuating the computer switch key 1' or the circuit breaker key 1''' on the keyboard 1.

The digital indicator can be reset to 00 00 00 so that any desired integral number of hours can be selected in advance. The timer indicator can also function so as to be set automatically to zero when switched on subsequent to a total power failure.

Figure 3:
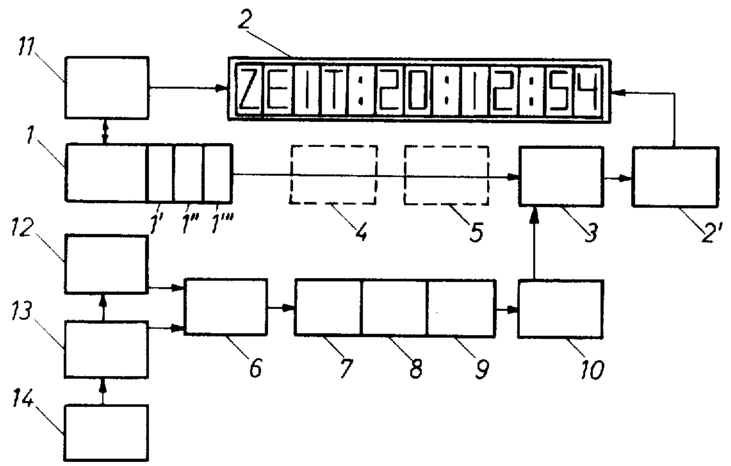
FIG. 3 shows the same data processing unit as that of FIG. 2 but wherein the timer is connected to the digital readout and those components which are not operating being represented by dashed lines.
Figure 4:
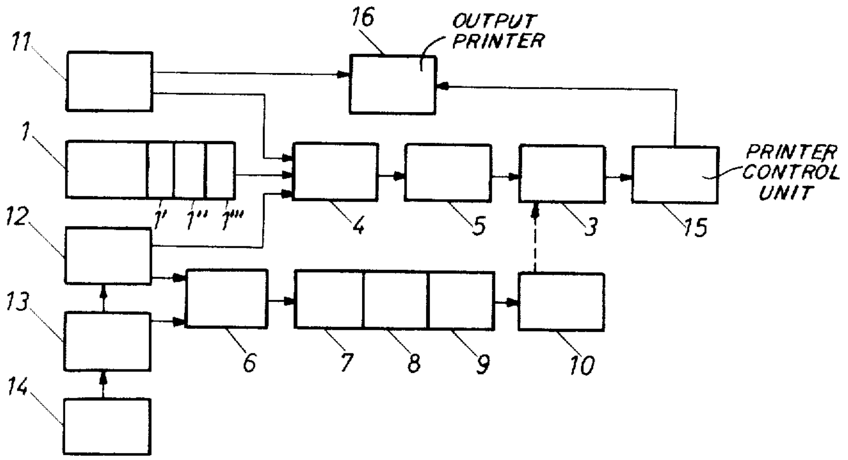
FIG. 4 is a block-diagram of a data processing unit similar to that of FIG. 1 but wherein the digital readout indicator is replaced by a printer output unit.

In FIG. 4, the same data processing unit as illustrated in FIG. 1–3 is provided with a printer control unit 15 and an output printer 16 in place of the decoder 2' and digital readout indicator 2. Except for this difference in the components, the operation of the computer and the timer unit is the same as described above in connection with FIG. 1–3. It is pointed out that the operational state shown in FIG. 4 corresponds to that illustrated in FIG. 1.

In view of the modular or building block principle employed by the present invention it is now possible to provide the digital timer in other electronic data output units such as in terminals, teletype machines, automatic printing computers, price displaying machines, bookkeeping machines and in connection with a servo clock timer system wherein a number of timers are actuated by a central timer unit.

Thus it is apparent that the present invention has disclosed an electronically controlled data processing unit having a built-in digital timer unit wherein the electronic components and the indicator elements already existing in the data processing unit are employed with the optimum degree of efficiency for the additional operation of a timer unit and which provides the possibility of selective utilization of an optical digital readout indicator for the time indication.

It will be understood that this invention is susceptible to modification in order to adapt it to different usages and conditions, and accordingly, it is desired to comprehend such modifications within this invention as may fall within the scope of the appended claims.

What is claimed is:

1. In a data processing unit having a computer, a digital readout indicator and a timer unit, the combination of a keyboard having a computer switch key, a timer switch key and a circuit breaker key thereon and connected to said computer, indicator and timer unit; said computer having a logic unit and output register and said timer unit having a frequency-divider counter unit and timing generator; a control switch connected to the outputs of said computer and said timer unit for connecting selectively one of the logic unit or the timer unit to the digital readout indicator; a first electrical current supply connected to the digital readout and logic unit through said circuit breaker key; and a second current supply connected permanently to said frequency divider and the timing generator.

2. In a data processing unit as claimed in claim 1 wherein said frequency divider counter unit is connected to said timing generator, an intermediate storage register connected to said frequency divider counter unit, said intermediate storage register being connected to said control switch when time is indicated in said digital readout indicator.

3. In a data processing unit as claimed in claim 1 wherein said data processing unit comprises an output printer unit in place of said digital readout indicator, said control switch selectively connecting said logic unit or the timer unit to said output printer unit.

* * * * *